US005604581A

United States Patent [19]
Liu et al.

[11] Patent Number: 5,604,581
[45] Date of Patent: Feb. 18, 1997

[54] FILM THICKNESS AND FREE CARRIER CONCENTRATION ANALYSIS METHOD AND APPARATUS

[75] Inventors: Shaohua Liu, San Jose, Calif.; Peter R. Solomon, West Hartford, Conn.; Peter A. Rosenthal, West Simsbury, Conn.; Stuart Farquharson, New Haven, Conn.

[73] Assignee: On-Line Technologies, Inc., East Hartford, Conn.

[21] Appl. No.: 319,749

[22] Filed: Oct. 7, 1994

[51] Int. Cl.$^6$ ............................ G01B 11/06; G01N 21/41
[52] U.S. Cl. .................................................. 356/73; 356/382
[58] Field of Search ........................................ 356/382, 73

[56] References Cited

PUBLICATIONS

Epifilm thickness Measurment Using Fourier Transform Infrared Spectroscopy; Effect of Refractive Index Dispersion and Refractive Index Measurment, J. Appl. Phys. 76(4), 15 Aug. 1994, pp. 2448–2454.
Infrared Reflectance Spectra of thin–Epitaxial Silicon Layers, SPIE. vol. 276, Optical Characterization Techniques for Semiconductor Technology (1981), pp. 222–226.
Applications of the theory of Optical Spectroscopy to Numerical Simulations, Applied Spectroscopy, vol. 47, No. 5, 1993, pp. 566–575.
FTIR–Spectroscopy of Layered Structures thin solid films, Coated Substrates, Profiles, Multilayers, SPIE vol. 1575, 8th International Conference on Fourier Transform Spectroscopy, (1991) pp. 169–179.
Bio–Rad Report (Epitaxial Thickness Measurements Using the Bio–Rad Labseries of Fourier Transform Infrared Spectrometers by K. Krishnan, Prasad Dasari, Phil Stout Bio–Rad Digilab Division).

*Primary Examiner*—Vincent P. McGraw
*Attorney, Agent, or Firm*—Ira S. Dorman

[57] ABSTRACT

The method determines the thickness and the free carrier concentration of at least one layer of a structure. An exposed surface of the structure is irradiated using spectral radiation, and the measured reflectance spectrum is compared to a calculated spectrum. Using algorithms that include terms representative of complex refractive indices, layer thickness, dielectric constants, and free carrier concentrations, values are iteratively assigned to the thickness and free carrier concentration parameters so as to produce a best fit relationship between the compared spectra, and to thereby determine those parameters.

29 Claims, 9 Drawing Sheets

Measured and Calculated Reflectance Spectra of a 1.15 μm Thick Epi-Silicon Film.

Calculated Reflectance Spectra with Different Film Thickness (0.9, 1.0, 1.1 μm) Based on the Two-Layer Model.

*Different Film Doping Concentration*

Calculated Reflectance Spectra with Film Doping Densities $n_{fe}$ = 0, 0.25, 0.5 $n_s$, Based on the Modified-Two-Layer Model.

*Different Substrate Doping Concentration*

Calculated Reflectance Spectra with Substrate Doping Densities $n_s$ = 0.25, 0.5, 1.0 x $10^{19}$cm$^{-3}$, Based on the Modified-Two-Layer Model.

Calculated Reflectance Spectra with Different Diffuse Layer Thickness $z_m$ ($z_m$ = 0-.1, 0.2, 0.3µm) Based on the Three-Layer Model.

TWO-LAYER MODEL

THREE-LAYER MODEL

FILM THICKNESS AND FREE CARRIER CONCENTRATION ANALYSIS METHOD AND APPARATUS

The United States Goverment has rights in this invention pursuant to contract No. F33615-92-C-1132, awarded by the U.S. Department of Defense (Air Force).

BACKGROUND OF THE INVENTION

Among the parameters that must be known and controlled in order to enable the fabrication of high quality semiconductor films and devices, and integrated circuits, are included the thicknesses of constituent layers and the concentrations of free carriers present therein. Techniques are known for determining those parameters, and are implemented in commercial instruments; as far as is known, however, no such instrument is entirely satisfactory, for any of several reasons.

Certain instruments presently available measure an interferogram of the material being evaluated, rather than utilizing a direct spectral analysis. A primary deficiency of such a method lies in its inability to provide information concerning the free carrier concentration, or doping density, of the material. A second deficiency resides in its inability to provide precise thickness measurements for thin layers and for layers with small differences in free carrier concentration, as compared to the substrate. Other instruments that are designed to measure epitaxial silicon layers by use of a representative interferogram, and that measure doping density in dielectric films by use of absorption peaks, suffer from similar deficiencies.

Ellipsometers are available which utilize a single frequency, or a narrow frequency range, to obtain thickness measurements. They cannot however separate the variation of thickness from the variation of dielectric function, and assumed dielectric constants are employed to derive thickness values, which may lead to inaccuracies. Such ellipsometers are moreover incapable of obtaining precise thickness information from complicated systems and nonuniform films, such as unannealed polycrystalline films, patterned wafers, and materials exhibiting dielectric functions that are strongly dependent upon frequency.

Certain other instruments require operation under ultra-high vacuum conditions, making product wafer characterization during fabrication impossible to achieve as a practical matter; also, they tend to perform relatively slowly and to be inordinately expensive. Although Secondary Ion Mass Spectrometers "SIMS" are capable of obtaining doping density profiles, they actually determine chemical, rather than active free carrier, concentrations, and they are not capable of distinguishing between annealed and unannealed samples; moreover, such apparatus operates ex-situ, and destructively.

The need is well known for accurate measurement of thickness and doping density information in the production of devices for the microelectronic industry. In an article entitled "Epifilm Thickness Measurement Using Fourier Transform Infrared Spectroscopy; Effect of Refractive Index Dispersion and Refractive Index Measurement" (J. Appl. Phys. 76(4), 15 August 1994), Zhou et al provide procedures and results of refractive index measurements, performed on both lightly and heavily doped silicon samples over the mid-infrared spectrum region. A strong dependence of refractive index, as a function of substrate dopant concentration, is reported, as is a significant variation with wavelength of the refractive index of heavily doped silicon material. The Zhou et al technique utilizes however only the real part of the refractive index, and a value of $\epsilon^*$ (the complex dielectric function) equal to the square of the refractive index. As a result, not all electric inactive modes are taken into account, which in turn leads to a degree of inaccuracy; also, the technique cannot compare measured and calculated spectra directly, and there is no suggestion for determining transition width values.

In a paper entitled "Infrared Reflectance Spectra of Thin-Epitaxial Silicon Layers" (SPIE Vol. 276, Optical Characterization Techniques For Semiconductor Technology (1981), pages 222 through 226), Senitzky et al discuss the investigation of IR reflectance spectra of thin expitaxial layers on substrates containing n-type buried layers. They report finding that the Drude model, with a constant relaxation time, should be used to compute the optical constants of the buried layers. The re-flectance spectra can then be used to determined epitaxial layer thickness, and maximum carrier concentration and diffusion width of a buried layer. The Senitzky et al method is also limited by its failure to take all electric inactive modes into account, as well as by a requirement for using heavily doped buried layers.

Milosevic et al report, in an article entitled "Applications of the Theory of Optical Spectroscopy to Numerical Simulations" (*Applied Spectroscopy,* Volume 47, Number 5, 1993, pages 566 through 575), development of a numerical simulation to extract the optical constants from experimental spectra. Potential applications for the method are said to include determining film thicknesses; no practical development or application for multilayer structures is provided, however, and free carrier concentration factors are not addressed.

A Bio-Rad Digilab Division report on epitaxial thickness measurements, authored by Krishman et al, discloses the use of FTIR spectrometers for the accurate determination of epitaxial layers, inclusive of silicon-on-silicon, silicon-on-sapphire, gallium arsenide-on-gallium arsenide, and mercury-cadmium-telluride-on-cadmium telluride. Because however all calculations employ interferograms, analyses are limited to thicknesses in excess of 1 µm; also, the technique is incapable of determining free carrier concentrations.

Characterization of thin solid films and surfaces by FTIR spectroscopy, based upon reflectance and transmittance measurements, is described by Grosse in an article entitled "FTIR-Spectroscopy of Layered Structures—Thin Solid Films, Coated Substrates, Profiles, Multilayers" (SPIE Vol. 1575, 8th International Conference on Fourier Transform Spectroscopy (1991), pages 169 through 179). Observed reflectance and transmittance are simulated by spectra, calculated from a model by an optimum fit of the model parameters, thereby characterizing the specimens in terms of vibronic resonances, contribution of free electrons and holes, thicknesses of the various layers in a stack, and profiles of chemical composition. The Gross article is however too general in certain significant aspects, such as in regard to the selection of appropriate parameters within the Drude model, to provide a practical analysis methodology.

SUMMARY OF THE INVENTION

Accordingly, it is a broad object of the present invention to provide a novel method, and novel apparatus for implementation of the method, whereby the free carrier concentration of one or more layers of material in a structure can be determined rapidly, without contact, non-destructively, in-situ or ex-situ, and on a real-time basis.

A related object of the invention to provide such a method and apparatus whereby the thickness of the layers of the structure can also be determined with a high degree of precision.

More specific objects of the invention are to provide such a method and apparatus whereby the film thickness and doping density of epitaxial films on heavily doped substrates (both typically, but not necessarily, silicon) can be determined, and whereby substrate doping densities, and characteristics of areas of patterned wafers, can also be readily determined.

Related objects of the invention are to provide such a method and apparatus by which the quality of fabricated films can be maximized and the conditions under which such films are produced can be optimized, which method and apparatus can more particularly be utilized to monitor free carrier concentration and sheet resistance for shallow junctions, both before and after annealing of the structures involved.

Additional specific objects are to provide a method and apparatus whereby silicon:nitrogen:hydrogen films can readily be characterized, whereby high levels of accuracy are afforded in making determinations, especially in films of two μm and thinner, and in which compensation for temperature-dependent equipment drift is readily achieved.

It has now been found that certain of the foregoing and related objects of the invention are attained by the provision of a method for determining the thickness and the free carrier concentration of at least one layer of a structure composed of k layers of material, wherein k is an integer and wherein the numbers 1,2 ... k designate the relative position of each layer j in the structure. An exposed surface of the structure is irradiated using spectral radiation within the range inclusive of the far-ultraviolet and far-infrared regions, and radiation reflected from the surface is measured to determine at least one reflectance spectrum R. A reflectance spectrum $R_c$ is calculated according to the expression:

$$R_c = a r_s^2 + (1-a) r_p^2,$$

wherein a is the instrument-dependent polarization coefficient and is a constant having a positive value less than unity, typically 0.5, and wherein $r_s$ and $r_p$ are the perpendicular (s) and parallel (p) polarized reflectance amplitude components of the reflectance spectrum and are calculated in accordance with the following known, matrix formalism:

$$r_s = \frac{(m_{11} + m_{12}g_{(k+1)s})g_{0s} - (m_{21} + m_{22}g_{(k+1)s})}{(m_{11} + m_{12}g_{(k+1)s})g_{0s} + (m_{21} + m_{22}g_{(k+1)s})}$$

$$r_p = \frac{(m_{11} + m_{12}g_{(k+1)p})g_{0p} - (m_{21} + m_{22}g_{(k+1)p})}{(m_{11} + m_{12}g_{(k+1)p})g_{0p} + (m_{21} + m_{22}g_{(k+1)p})}$$

wherein the matrix components: $m_{11}$, $m_{12}$, $m_{21}$, $m_{22}$ are derived from the matrix product:

$$\begin{bmatrix} m_{11} & m_{12} \\ m_{21} & m_{22} \end{bmatrix} = \prod_{j=1}^{k} m_j$$

wherein the matrices $m_j$ are determined separately for each layer j, being defined for the perpendicular and parallel polarization, respectively, by:

$$m_{jp} = \begin{bmatrix} \cos b_{jp} & -i\sin b_{jp}/g_{jp} \\ -ig_{jp}\sin b_{jp} & \cos b_{jp} \end{bmatrix}$$

$$m_{js} = \begin{bmatrix} \cos b_{js} & -i\sin b_{js}/g_{js} \\ -ig_{js}\sin b_{js} & \cos b_{js} \end{bmatrix}$$

wherein $b_j$ is the optical path difference between the interface of each layer j, and wherein $g_j$ is the effective complex refractive index, in accordance with the expressions:

$$b_{js} = 2 p n z_j (h_j + i k_j) \cos q_{js}$$

$$g_{js} = (j_j + i j_j) \cos q_{js}$$

$$b_{jp} = 2 p n z_j (h_j + i k_j) \cos q_{jp}$$

$$g_{jp} = \cos q_{jp}/(h_j + i k_j)$$

wherein n represents the wavenumbers of the irradiating radiation, $z_j$ is the thickness of each layer j, $(h_j + i k_j)$ is the complex refractive index of each layer j, $q_{js}$ and $q_{jp}$ are the angles of radiation inside each layer j in accordance with the expressions:

$$h_0 \sin q_0 = h_j \sin q_{js}$$

$$h_0 \sin q_0 = h_{js} \sin q_{jp}$$

wherein $h_0$ is the refractive index of the environmental medium, and $q_0$ is the angle of the irradiating radiation incident to the surface, and wherein the complex refractive index for the "one" layer, the $j^{th}$ layer, is calculated in accordance with:

$$(h_j + i k_j)^2 = e_u(w) - 4p(n_j e^2/m^*)/(w^2 + iw\tau^{-1}),$$

wherein $e_u(w)$ represents the dielectric constant of the material of which the $j^{th}$ layer is composed, but devoid of free carriers, as a function of frequency w, e is the charge of the free carrier and has the nominal value of $1.6 \times 10^{-19}$ coulombs, $m^*$ is the effective mass of the carrier, $\tau$ is the scattering time of the carrier, and $n_j$ is the free carrier concentration of the $j^{th}$ layer. Finally, the calculated spectrum $R_c$ is compared to the determined spectrum R, and values are iteratively assigned to the parameters $n_j$ and $z_j$ so as to achieve a best fit relationship between the spectra $R_c$ and R, to thereby determine $n_j$ and $z_j$.

The method may include the further step of providing a measured reflectance spectrum $R_u$ of the carrier-devoid material, and determining $e_u(w)$ in accordance with the expression: $e_u(w) = [(1 + R_u^{1/2})/(1 - R_u^{1/2})]^2$. It may additionally include the step of providing a measured reflectance spectrum $R_d$ of a comparable material, having substantially the same composition and free carrier concentration as the $j^{th}$ layer, and determining, with reference to the $R_d$ spectrum, $m^*$ and $\tau$, by application of the expressions:

$$(h_d + i k_d)^2 = e_u(w) - 4p(n_d e^2/m^*)/(w^2 + iw\tau^{-1})$$

$$R_{dc} = [(h_d - 1)^2 + (k_d)^2 + (k_d)^2]/[(h_d + 1)^2 + (k_d)^2],$$

wherein $(h_d + i k_d)$ is the complex refractive index of the comparable material, wherein $n_d$ is the known free carrier concentration of the comparable material, and wherein $R_{dc}$ is a calculated reflectance spectrum of the comparable material and is compared to the measured spectrum $R_d$, values being iteratively assigned to the parameters $\tau$ and $m^*$ so as to achieve a best fit relationship between the spectra $R_d$ and $R_{dc}$ and to thereby determine the parameters $\tau$ and $m^*$.

When the structure is composed of at least two layers the thickness and free carrier concentration may be determined for at least one other layer in addition to the "one" layer.

In preferred embodiments of the method, a transition width $z_t$, having free carrier concentration $n_t$ and disposed between the $j^{th}$ layer and an adjacent layer $j\pm 1$, is determined. One manner of doing so is in accordance with the expression: $n_t=(n_j+n_{j\pm 1})/2$, wherein $n_{j\pm 1}$ is the free carrier concentration of the adjacent layer, the calculated spectrum $R_c$ being compared to the determined spectrum R, and values being iteratively assigned to the parameter $z_t$, so as to achieve a best fit relationship between the spectra $R_c$ and R, to thereby determine $z_t$. The method may be carried out using a structure in which at least one other of the j layers is devoid of free carriers, in which case $n_{ju}$ will equal zero, $(h_{ju}+ik_{ju})^2$ will equal $e_u(w)$, and $h_{ju}$ and $k_{ju}$ may be predetermined.

In accordance with further embodiments of the method, a transition layer $z_t$, having a free carrier concentration that varies with depth $n_z$ and disposed between the $j^{th}$ layer and an adjacent layer $j\pm 1$, is determined by employing, to compute a simulated reflectance spectrum, a matrix describing the carrier concentration depth profile $m_z$. The transition layer carrier concentration depth profile $n_z$ may be determined from secondary ion mass spectrometry measurements, or it may be determined through numerical solution of the diffusion equation:

$$\frac{\delta n_z}{\delta t} = \frac{\delta}{\delta z}\left[ D(T,n_z,t)\frac{\delta n_{z,t}}{\delta z} \right]$$

wherein, t is the time for which diffusion has taken place, D is the diffusion coefficient, and T is the temperature history for diffusion. The transition layer carrier concentration depth profile $n_z$ may also be determined by comparing the calculated spectrum $R_c$ to the determined spectrum R, and iteratively adjusting the transtion layer thickness $z_t$ and the transition layer carrier profile $n_z$ so as to achieve a best fit relationship between the spectra $R_c$ and R, to thereby determine the thickness and carrier concentration profile of the transition layer. By employing more accurate carrier concentration profiles in the method, substantially more accurate values for adjacent layer thickness and carrier concentration determination may be obtained.

The method may be so effected as to obtain a plurality of reflectance spectra from a plurality of areas on the exposed surface of the structure, to thereby produce a property-defining map of the structure surface. In many instances, the method will include the further steps of providing a substrate, preparing the structure in a deposition reactor by depositing at least the one layer j upon the substrate, determining free carrier concentration of the substrate prior to deposition of the one layer, and performing the radiation measurement at a speed sufficient to allow the thickness and free carrier concentration of the one layer to be determined as it is deposited. The structure will normally be fabricated from a material selected from the group consisting of: metals, conducting metal oxides, doped semiconductors, undoped semiconductors, superconductors and conducting polymers. Other layers may be non-conducting polymers, and ferroelectrics and other dielectrics. Accepted definitions of doping are as follows: "intrinsic"—a material having less than $10^{12}$ carriers per $cm^3$, "undoped"—a material that has not been treated, but has $10^{14}$ to $10^{17}$ carriers per $cm^3$, "doped"—a material having $10^{17}$ to $10^{19}$ carriers per $cm^3$ and "heavily doped"—a material having $10^{19}$ to $10^{21}$ carriers per $cm^3$.

In certain specific embodiments, the "one" layer will be an epitaxial silicon film, and the structure will be deposited upon a doped silicon substrate; the one layer will deskably be of sub-micron thickness, and will have a free carrier concentration below $5\times 10^{17}/cm^3$. In other cases the one layer will be a doped polycrystalline silicon layer, with a first contacting layer on one side of the one layer being a cap of $SiO_2$, with a second contacting layer on the opposite side of the one layer being a layer of thermal $SiO_2$ having a known refractive index $(h_j+ik_j)$, and a known thickness z, and with an undoped silicon substrate being disposed in contact with the second contacting layer. A desirable poly-silicon construction may employ a structure in which a first layer (j=1) is the "one" layer and is a doped polycrystalline silicon layer, a second layer (j=2), adjacent to the first a layer, is a very thin $SiO_2$ film gate having a thickness of 20 to 200 angstroms, and a third layer (j=3), adjacent the second layer, is a silicon substrate, the measurement being made with the polycrystalline silicon layer in unannealed condition.

The method may be carried out on an instrument that exhibits a temperature-dependent drift, in which case the reflectance spectrum R of the structure is preferably corrected for such drift using the instrument to measure radiation reflected from a selected material at an initial time and some later time, to generate reflectance spectra $R_0$ and $R_t$, respectively, thereby determining an instrument wavenumber dependent response function, $f(n_c)$, defined as a best fit to $R_t/R_0-1$. A wavenumber $n_c$ is selected, at which reflection without drift $R_{dc}(n_c)$ is known to occur, and a correction factor C is determined in accordance with the relationship: $C = [R(n_c)-R_{dc}(n_c)]/[R_{dc}(n_c)f(n_c)]$. The initially measured spectrum R is then corrected in accordance with the expression: $R_{dc}(n)=R/[1+Cf(n_c)]$. For epitaxial silicon, for instance, the reflectance $R_{dc}(n_c)$ may be determined a short wavelength where the index of refraction of the substrate matches that of the film, or at one of the interference fringe minima where the reflection matches that of the substrate. In all instances, the reflectance spectrum R may advantageously be determined with reference to a surface of known reflectance, such as gold.

Other objects of the invention are attained by the provision of apparatus for the analysis of an article, which apparatus comprises means for producing electromagnetic radiation of frequencies n throughout a selected spectral range, and for causing such radiation to impinge, at a selected angle of incidence, upon the surface of a structure supported in position proximate the apparatus; means for continuously measuring, as a function of frequency, specular reflectance of such impinging radiation from the surface of the structure so supported, and for storing data so obtained; and electronic data processing means. The structure to be analyzed is composed in accordance with the description set forth hereinabove, and the data processing means is programmed and operatively connected for processing reflectance data obtained by the means for measuring so as to determine the thickness and free carrier concentration of at least one layer of the supported structure, programming of the data processing means being such as to carry out the steps hereinabove set forth.

In certain embodiments, the apparatus will further include means for supporting the structure subjected to analysis, such means being movable, relative to the means for producing and the means for measuring, so as to enable a plurality of spectra to be obtained from a plurality of areas on the surface of the structure. As a result, the apparatus will have the capability of producing a property-defining map of the structure surface.

The apparatus may further include a processing chamber, with the means for measuring and the electronic data processing means being operative at a rate sufficient to enable film thickness and free carrier concentration of the "one" layer, as it is deposited within said chamber. The apparatus may further include means for controlling temperature within the chamber, with the means for measuring and the data processing means being capable of operation at temperatures in the range of 0° C. to 1000° C.

DETAILED DESCRIPTION OF THE PREFERRED AND ILLUSTRATED EMBODIMENTS

Figure 1:
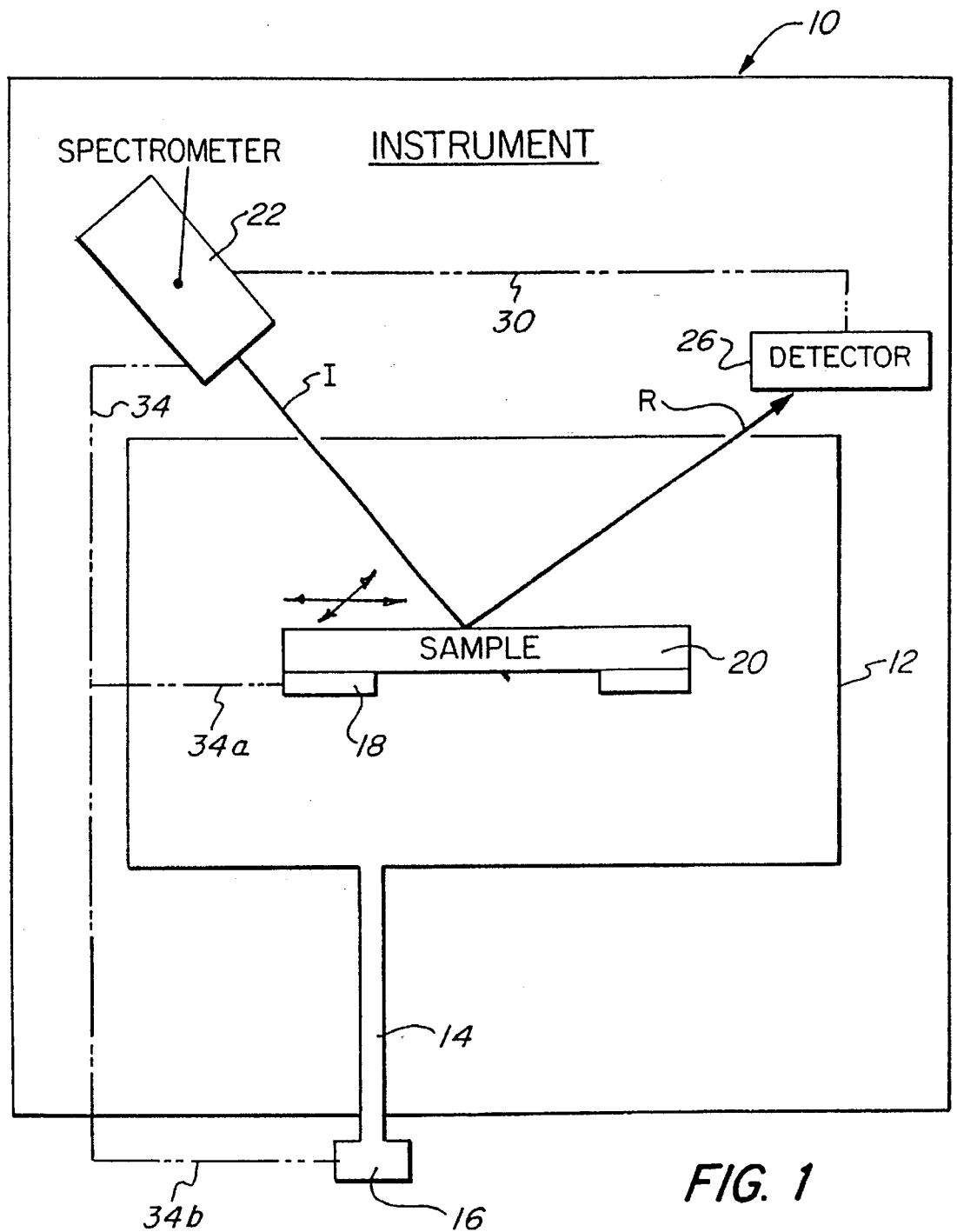
FIG. 1 is a diagrammatic view of a unitary instrument embodying the apparatus of the invention.

Turning now in detail to FIG. 1 of the drawings, therein diagrammatically illustrated is an instrument embodying the present invention, generally designated by the numeral 10. Defined within the instrument 10 is a sample compartment 12, into which leads a conduit 14 connected to a valved gas supply 16. A support 18 is provided within the chamber 12, and serves to support the sample or substrate 20 being monitored by the instrument while processing is performed thereon; the support 18 is movable on X-Y axes, to permit analysis of discrete areas and thereby to permit mapping of the surface of a structure or article being analyzed and/or fabricated.

The instrument 10 also includes an FT-IR spectrometer (including a computer, usual optics, interferometer, and all of the other conventional components thereof), with which is associated a reflectance detector 26 operatively connected to the spectrometer by line 30. A line 34 leads from the spectrometer to the heating element of the sample support 18 and the valve of the gas supply 16, through branches 34a and 34b, respectively, operatively connecting them for control by the spectrometer 22. As indicated by the letter I, the incident radiation impinging upon the sample 20 follows a path from the spectrometer 22, being reflected to the detector 26. The manner in which the reflectance is employed for determining the properties of the sample 20 is described in detail herein; the data so obtained may be used for feedback control of power to the heated support 18 and gas flow from the supply 16, as well as for other purposes.

Figure 2:
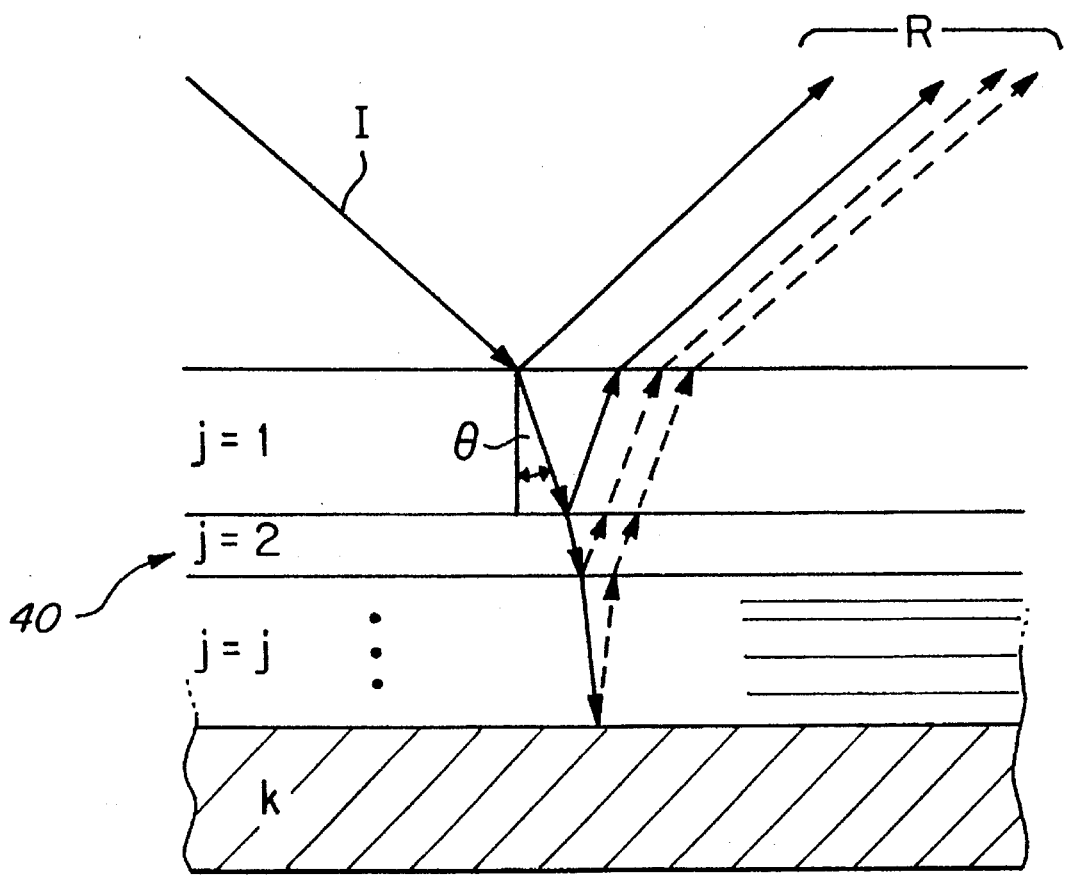
FIG. 2 is a diagrammatic representation showing radiation reflectance from a multilayer structure.

Reflectance R of incident ratiation I from a multilayer structure, generally designated by the numeral 40, is shown in FIG. 2. The structure consists of a number of layers 1, 2 . . . j, deposited on a substrate k and bounded by the environmental medium, which may of course be air, vacuum, nitrogen, or other gas, adjacent the top layer 1. The angle of radiation inside layer 1 is depicted.

EXAMPLE ONE

One use of the invention is demonstrated by the following example, wherein the thickness of a lightly doped layer of an epitaxial silicon film, the width and free carrier concentration of a transition layer, and the free carrier concentration of a silicon substrate are determined.

Figure 3:
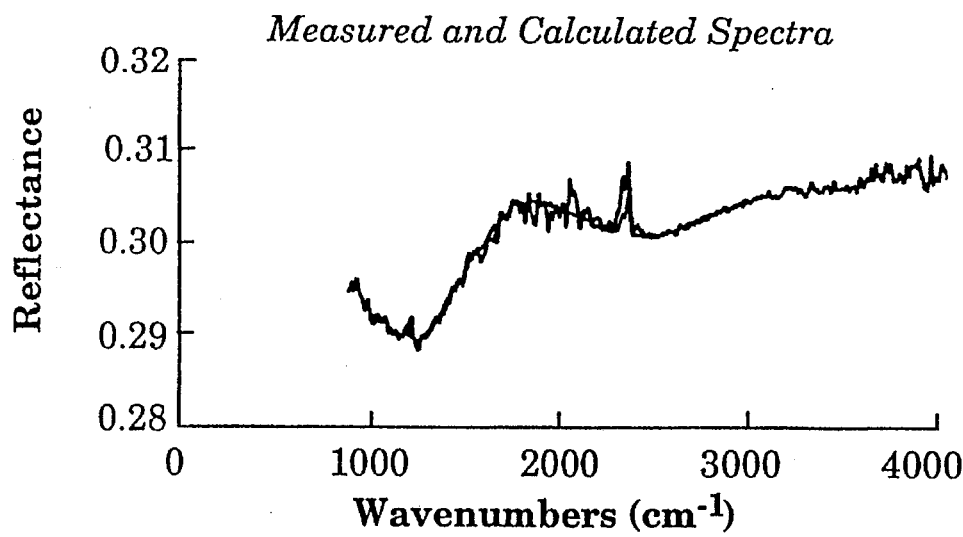
FIGS. 3, 4, 5, 6 and 7 are curves showing spectra measured and calculated in accordance with the method of the invention.
Figure 4:
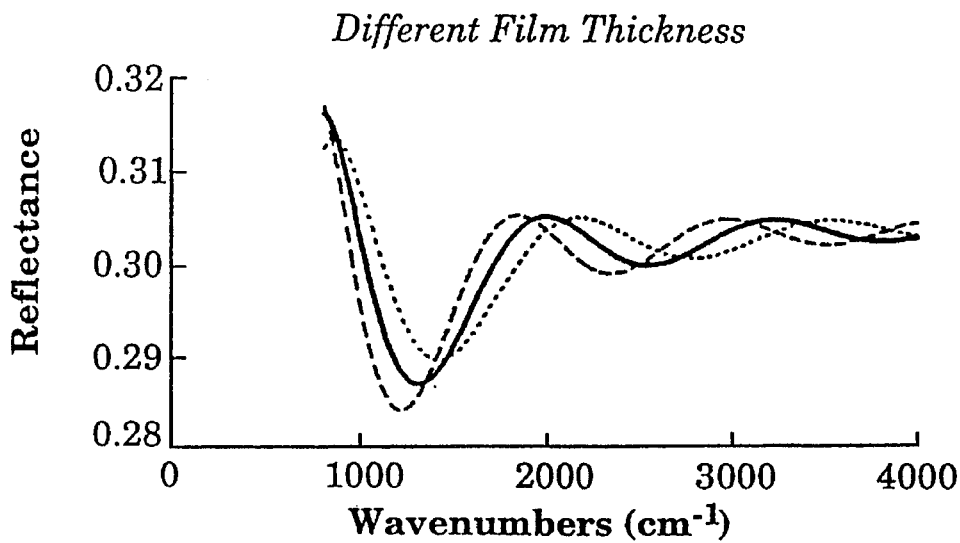
Figure 5:
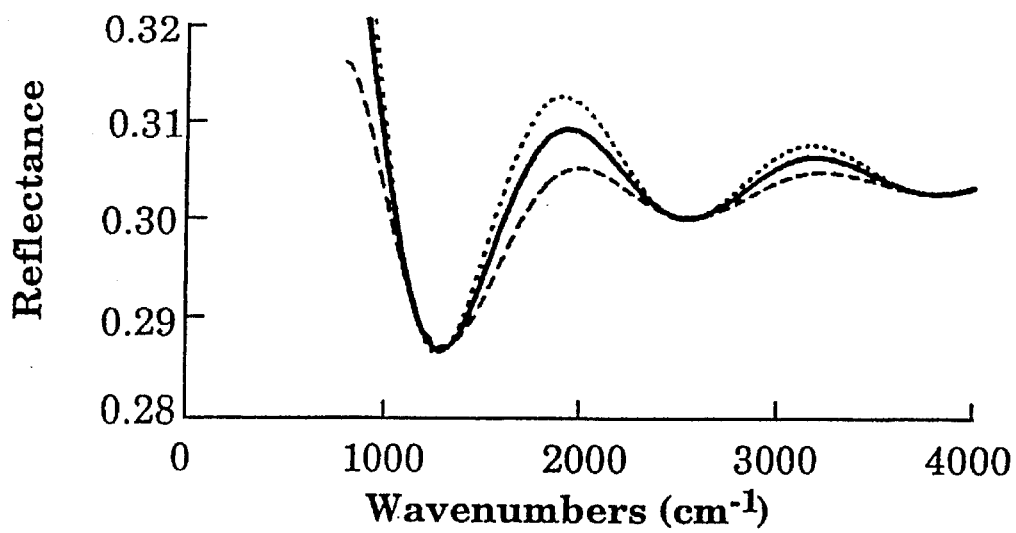
Figure 6:
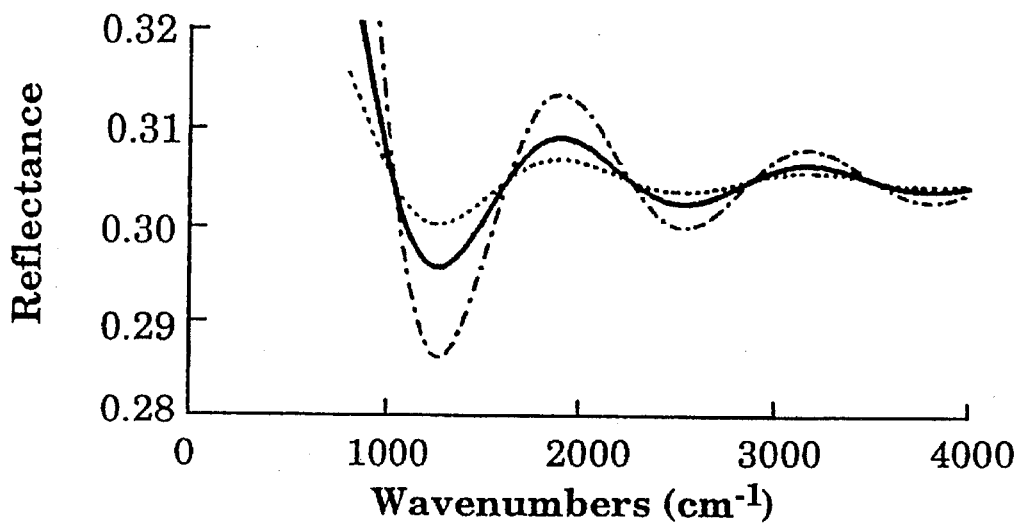
Figure 7:
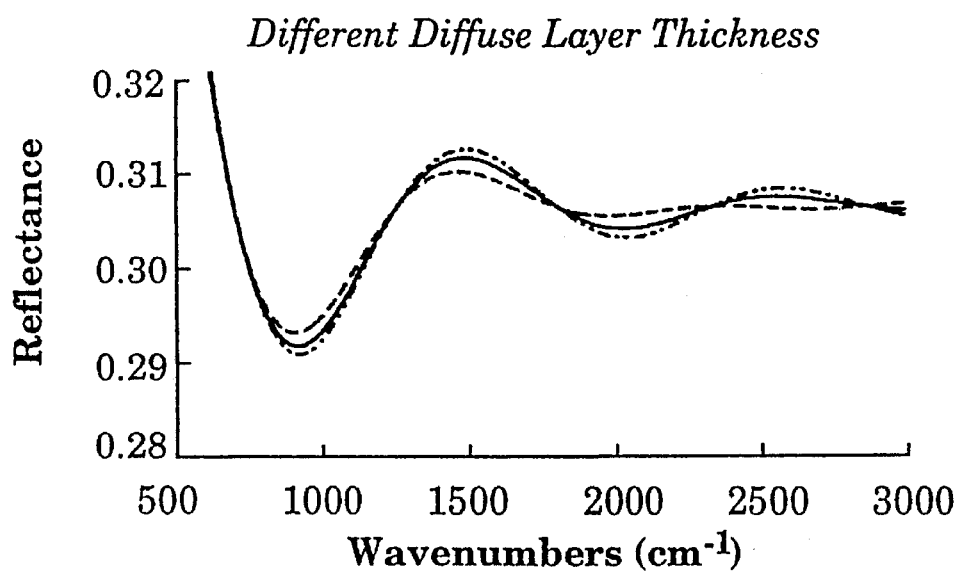
Figure 8:
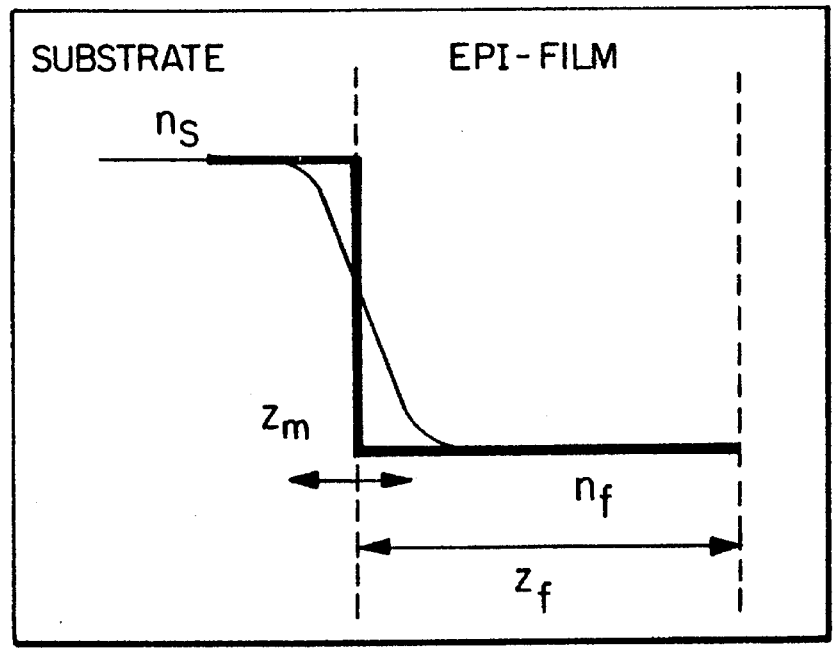
FIGS. 8 and 9 are representations of doping profiles for an epitaxial film on a substrate, modeled respectively as two and three layers.
Figure 9:
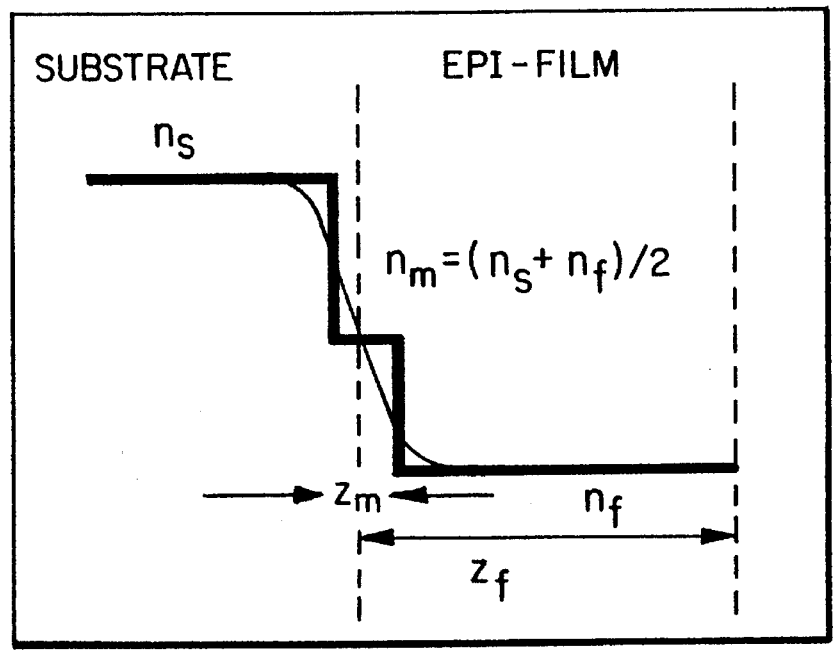

A structure composed of two layers, an undoped epitaxial silicon film layer (j=1) deposited on a silicon substrate, was irradiated by infrared radiation from 750 to 4000 cm$^{-1}$, and the reflected radiation measured to produce a reflectance spectrum R, shown as the more irregular curve in FIG. 3. The calculated reflectance spectrum $R_c$, shown as the smoother curve in FIG. 3, was determined as follows:

First, the structure is modeled as two distinct layers, as shown in FIG. 7, wherein the free carrier concentration of the epitaxial silicon film $n_f$ is assumed to be zero. In this model, $n_s$ and $z_f$ are varied, resulting in changes in the amplitude and period of the interference features, until the difference between $R_c$ and R provide a "best" fit. Examples of how $R_c$ changes with $n_s$, holding $z_f$ constant are demonstrated in FIG. 4. The effect of varying, the epitaxial silicon layer thickness $z_f$, while holding $n_s$ constant, is demonstrated in FIG. 5. In starting the simulation the initial value of the silicon substrate $n_s$ is assumed to be heavily doped at $0.5 \times 10^{19}$ cm$^{-3}$ Next, these values obtained from the two layer model are introduced as the starting values into a three layer model, shown in FIG. 8. The middle layer is a transition layer, assumed to exist as the result of thermal diffusion. The carrier concentration of the substrate is held constant at the value derived in the two layer model. The carrier concentration of the transition layer $n_t$, is assumed to be the simple average of the carrier concentration of the epitaxial silicon layer and the silicon substrate, in this case one half of $n_s$. The width of a transition layer $z_t$, and the film thickness are then varied until the difference between $R_c$ and R provide a "best" fit, as demonstrated in FIG. 6 and shown in FIG. 3.

For improved accuracy the transition region can be represented by three or more layers with equal steps in the carrier concentration or steps which vary according to a measured transition region shape, or according to a model of the diffusion process or other appropriate model.

EXAMPLE TWO

Figure 10:
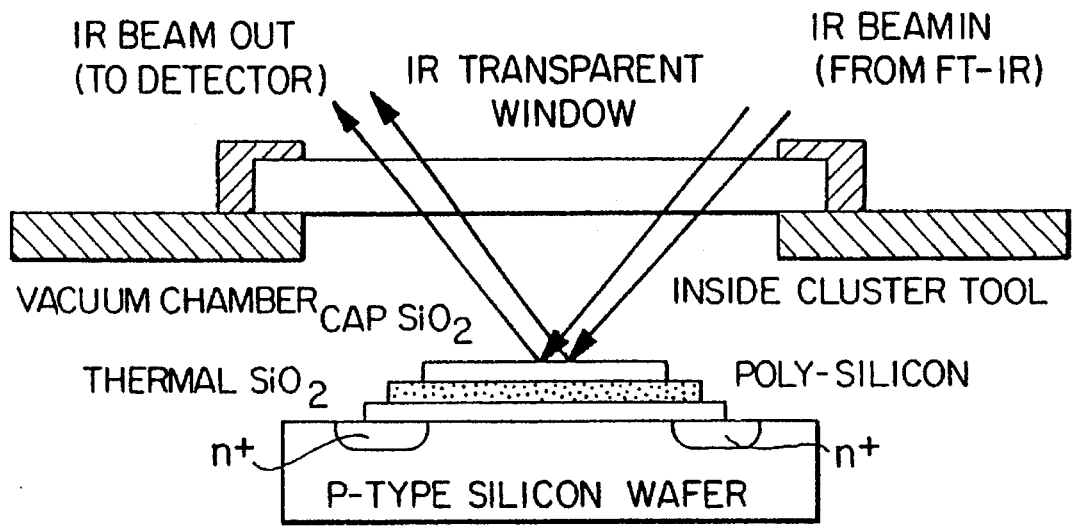
FIG. 10 diagrammatically illustrates an arrangement for on-line process monitoring for poly-silicon layer formation.

In a second example the measured reflectance spectrum is used to determine composition, carrier concentration and thickness in a multilayer structure composed of a silicon substrate, a SiO$_2$ thermal barrier, a polycrystalline silicon layer and a SiO$_2$ cap layer. This structure, shown in FIG. 10, is representative of MOS integrated circuits.

Figure 11:
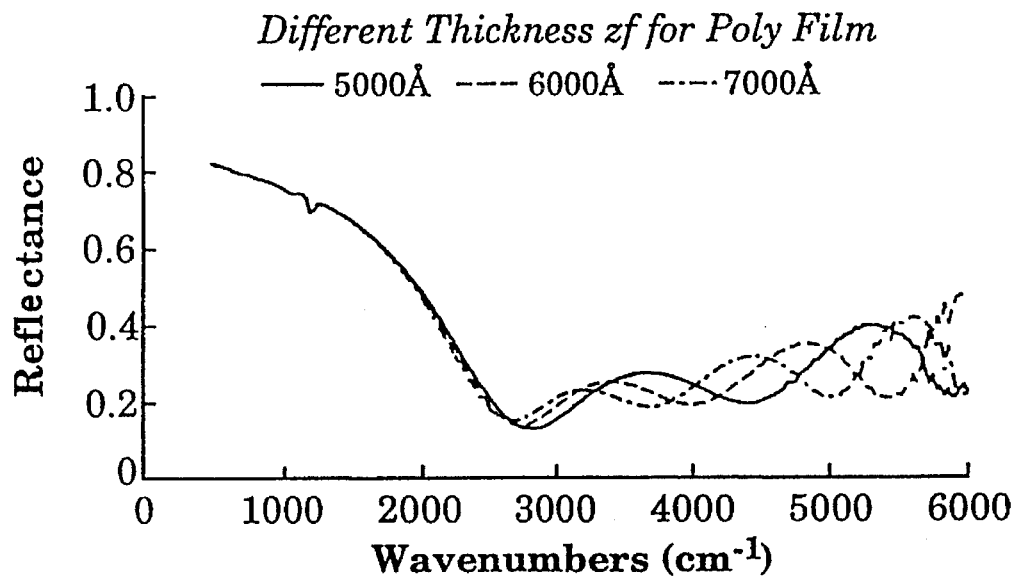
FIG. 11 through 14 are reflectance spectra characterizing the layers of the multilayer poly-silicon structure.
Figure 12:
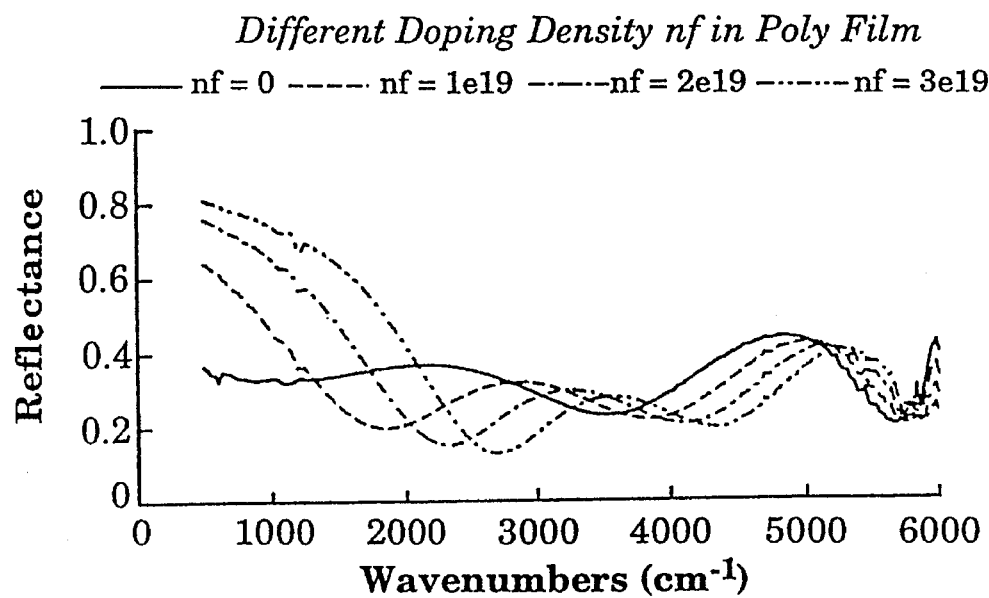

Changes in the reflectance spectra resulting from poly-silicon film thickness are shown in FIG. 11. It will be noted that the greatest changes occur in the spectral region above 2500 cm$^{-1}$ and the magnitude of these changes increase with the increase in wavenumber. Changes in doping density in the polysilicon film occur below 3000 cm$^{-1}$ and are dominated by free electron adsorption. This is illustrated in FIG. 12. Thus, the thickness and the doping density can be determined independently.

Figure 13:
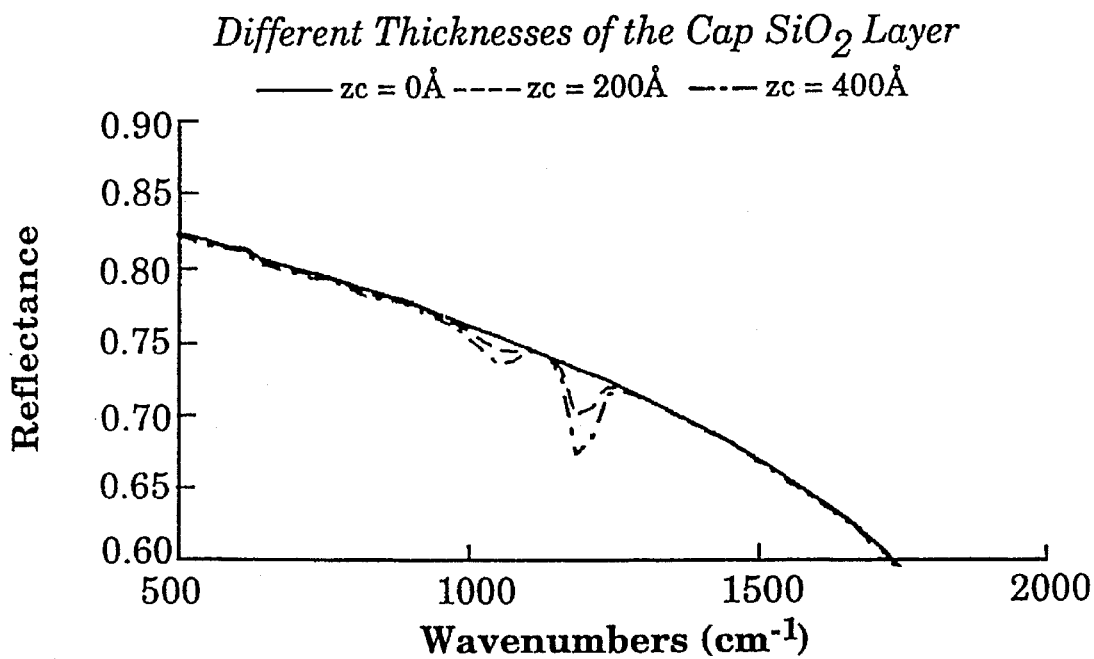
Figure 14:
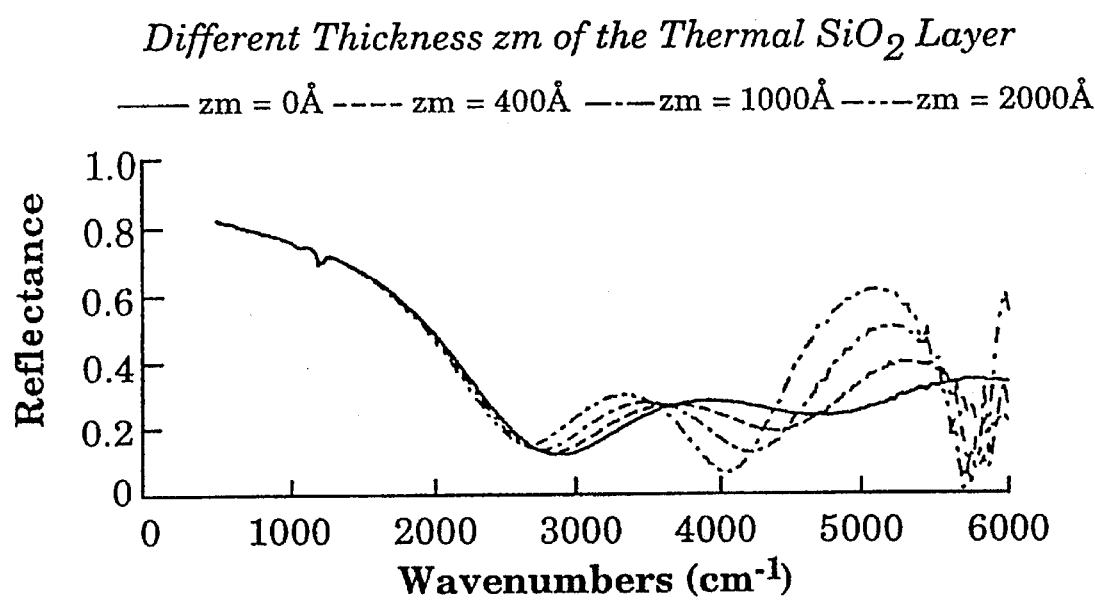

The cap oxide layer and the thermal oxide layer also affect the reflectance spectrum in different ways. The well know asymmetric stretching mode for SiO$_2$ appears and increases rapidly when the thickness of the cap oxide increases, as shown in FIG. 13. Changes in the thermal oxide thickness are primarily manifested in the interference features. This is shown in FIG. 14. The reflectance spectrum can be used to measure thermal oxides as thin as 20 A. This result is of particular interest for MOS devices.

The dopant densities which were obtained for the corresponding spectra allow the percentages of amorphous, polycrystalline silicon, and voids for the corresponding films to be determined.

It will be appreciated that the method of the invention can be utilized for the on-line analysis and fabrication of a wide variety of articles; it is however applied with particular advantage in the production of semiconductor devices. The process can involve not only the deposition of a material or materials upon the surface of a substrate, to produce a film or layer-like deposit, but also the treatment of a surface to selectively remove the material thereof (e.g., by etching or ablation), or to effect its chemical modification or conversion. Generally, but not necessarily, processing will take place in a chamber, such as for the confinement of a plasma in semiconductor manufacture, for chemical-vapor deposition (CVD), for thermal annealing, etc. Measurements may be performed at room temperature, process temperature, and at other activation temperatures, which will generally be in the range of 0° C. to 1000° C.

Operating conditions, and the regulation and modification thereof, will depend of course upon the nature of the treatment to which the substrate is subjected in the process, and upon the properties that the product, and its constituent layers or films, are to have. The many variables that might be controlled will be evident to those skilled in the art; typically however they include the power supply to a substrate heater, a plasma power supply, the flow, composition, pressure, and temperature of a gaseous reactant stream, and of course process termination. These conditions will be maintained, varied or implemented depending upon one or more of a number of parameters; however, the methodology of the invention is most fundamentally concerned with free carrier concentrations (or, as a special case, doping densities), and layer thicknesses. It might be mentioned that any treatment involved in the practice of the invention will usually be carried out at a temperature in the above-noted range, and that when films are produced their thicknesses will generally not exceed 100 μm; an outstanding advantage of the present method and apparatus resides of course in the ability they afford to perform accurate analyses on films of 2 μm, and much thinner.

Although an FT-IR spectrometer will preferably comprise the apparatus of the invention, and be employed in carrying out the method hereof, other means may be used for obtaining the relevant data; apparatus that generates and measures polarized radiation may be employed to detect changes in polarization, if so desired, IR fiber-optic means may be utilized, etc. Transmittance and radiance measurements may also be made to determine additional parameters, as appropriate.

Thus it can be seen that the present invention provides a novel method, and novel apparatus for implementation of the method, whereby the free carrier concentration of one or more layers of material in a structure can be determined rapidly, without contact, nondestructively, in-situ or ex-situ, and on a real-time basis. The method and apparatus also enable the thickness of the layers of the structure to be determined with a high degree of precision, as can doping densities and characteristics of areas of patterned wafers. By use of the invention, the quality of fabricated films can be maximized and the conditions under which such films are produced can be optimized; in addition, free carrier concentration and sheet resistance for shallow junctions can be monitored, both before and after annealing of the structures involved. Silicon:nitrogen:hydrogen films can readily be characterized, compensation for equipment drift may be afforded, and accurate analyses of films of two micrometers and thinner can readily be carried out. Finally, it should be understood that the comparison between the measured and calculated reflectance spectra could be made using the untransformed interferogram, if so desired.

Having thus described the invention, what is claimed is:

1. A method for determining the thickness and the free carrier concentration of at least one layer of a structure, comprising the steps:

(a) providing a structure composed of k layers of material, wherein k is an integer and wherein the numbers 1,2 . . . k designate the relative position of each layer j in said structure;

(b) irradiating an exposed surface of said structure using spectral radiation within the range inclusive of the far-ultraviolet and far-infrared regions;

(c) measuring radiation reflected from said surface to determine at least one reflectance spectrum R from said surface;

(d) calculating a reflectance spectrum $R_c$ according to the expression:

$$R_c = a r_s^2 + (1-a) r_p^2,$$

wherein a is the instrument-dependent polarization coefficient and is a constant having a positive value not greater than unity, and wherein $r_s$ and $r_p$ are the perpendicular (s) and parallel (p) polarized reflectance amplitude components of the reflectance spectrum and are calculated in accordance with the following matrix formalism:

$$r_s = \frac{(m_{11} + m_{12} g_{(k+1)s}) g_{0s} - (m_{21} + m_{22} g_{(k+1)s})}{(m_{11} + m_{12} g_{(k+1)s}) g_{0s} + (m_{21} + m_{22} g_{(k+1)s})}$$

$$r_p = \frac{(m_{11} + m_{12} g_{(k+1)p}) g_{0p} - (m_{21} + m_{22} g_{(k+1)p})}{(m_{11} + m_{12} g_{(k+1)p}) g_{0p} + (m_{21} + m_{22} g_{(k+1)p})}$$

wherein the matrix components: $m_{11}$, $m_{12}$, $m_{21}$, $m_{22}$ are derived from the matrix product:

$$\begin{bmatrix} m_{11} & m_{12} \\ m_{21} & m_{22} \end{bmatrix} = \prod_{j=1}^{k} m_j$$

wherein the matrices $m_j$ are determined separately for each layer j being defined for the perpendicular and parallel polarization, respectively, by:

$$m_{jp} = \begin{bmatrix} \cos b_{jp} & -i \sin b_{jp}/g_{jp} \\ -i g_{jp} \sin b_{jp} & \cos b_{jp} \end{bmatrix}$$

$$m_{js} = \begin{bmatrix} \cos b_{js} & -i \sin b_{js}/g_{js} \\ -i g_{js} \sin b_{js} & \cos b_{js} \end{bmatrix}$$

wherein $b_j$ is the optical path difference between the interface of said each layer j, and wherein $g_j$ is the effective complex refractive index, in accordance with the expressions:

$$b_{js} = 2 p n z_j (h_j + i k_j) \cos q_{js}$$

$$g_{js} = (h_j + i k_j) \cos q_{js}$$

$$b_{jp} = 2 p n z_j (h_j + i k_j) \cos q_{jp}$$

$$g_{jp} = \cos q_{jp}/(j_j + i k_j)$$

wherein n represents the wavenumbers of said radiation, $z_j$ is the thickness of said each layer j, $(h_j+ik_j)$ is the complex refractive index of said each layer j, $q_{js}$ and $q_{jp}$ are the angles of radiation inside said each layer j in accordance with the expressions:

$$h_0 \sin q_0 = j_s \sin q_{js}$$

$$h_0 \sin q_0 = h_j \sin q_{jp}$$

wherein $h_0$ is the refractive index of air, and $q_0$ is the angle of said radiation incident to said surface, and wherein the complex refractive index for said one layer, the $j^{th}$ layer, is calculated in accordance with:

$$(j_j+ik_j)^2 = e_u(w) - 4p(n_j e^2/m^*)/(w^2+iw\tau^{-1}),$$

wherein $e_u(w)$ represents the dielectric constant of the material of which said $j^{th}$ layer is composed, but devoid of free carriers, as a function of frequency w, e is the charge of the free carrier and has the nominal value $1.6 \times 10^{-19}$ coulombs, m* is the effective mass of said carrier, $\tau$ is the scattering time of said carrier, and $n_j$ is the free carrier concentration of said $j^{th}$ layer; and (e) comparing said calculated spectrum $R_c$ to said determined spectrum R, and iteratively assigning values to the parameters $n_j$ and $z_j$ so as to achieve a best fit relationship between said spectra $R_c$ and R, to thereby determine $n_j$ and $z_j$.

2. The method of claim 1, wherein said structure is composed of at least two layers, and wherein the thickness and free carrier concentration is determined for at least one other of said layer j.

3. The method of claim 1, including the further step of providing a measured reflectance spectrum $R_u$ of said carrier-devoid material, and determining $e_u(w)$ in accordance with the expression:

$$e_u(w) = [(1+R_u^{1/2})/(1-R_u^{1/2})]^2s .$$

4. The method of claim 3, including the futher step of providing a measured reflectance spectrum $R_d$ of a comparable material, having substantially the same compositon and free carrier concentration as said $j^{th}$ layer, and determining, with reference to said $R_d$ spectrum, m* and $\tau$, by application of the expressions:

$$(h_d+ik_d)^2=e_u(w)-4p(n_d e^2/m^*)/(w^2+iw\tau^{-1}) \; R_{dc}=[(h_d-1)^2+(k_d)^2]/[(h_d+1)^2+(k_d)^2],$$

wherein $(h_d+ik_d)$ is the complex refractive index of said comparable material, wherein $n_d$ is the known free carrier concentration of the said comparable material, and wherein, $R_{dc}$ is a calculated reflectance spectrum of said comparable material and is compared to said measured spectrum $R_d$, values being iteratively assigned to the parameters $\tau$ and m* so as to achieve a best fit relationship between said spectra $R_d$ and $R_{dc}$ and to thereby determine said parameters $\tau$ and m*.

5. The method of claim 1, wherein, a carrier concentration is determined for a layer j±1 adjacent said $j^{th}$ layer, and wherein a transition width $z_t$, having free carrier concentration $n_t$ and disposed between said $j^{th}$ layer and said adjacent layer j±1, is the simple average of the previously determined carrier concentrations in the $j^{th}$ and j±1 layers, and is determined in accordance with the expression:

$$n_t=(n_{j\pm1})/2,$$

wherein $n_{j\pm1}$ is the free carrier concentration of said adjacent layer, said calculated spectrum $R_c$ being compared to said determined spectrum R, with values being iteratively assigned to the parameter $z_t$ so as to achieve a best fit relationship between said spectra $R_c$ and R, to thereby determine $z_t$.

6. The method of claim 5, wherein the process of subdividing the transition layer is repeated until a diffusion profile between the original layers j and j+1 has been created.

7. The method of claim 1, wherein a transition layer $z_t$, having a free carrier concentration that varies with depth $n_z$ and being disposed between said $j^{th}$ layer and an adjacent layer j+1, is predetermined from secondary ion mass spectrometry measurements of a comparable material, to describe a matrix of said carrier concentration depth profile $m_z$ is determined, said matrix, being employed in the computation of a simulated reflectance spectrum wherein the thickness of the j+1 layer $z_f$ is varied so as to achieve a best, fit relationship between said spectra $R_c$ and R, to thereby determine the thickness of the j+1 layer.

8. The method of claim 7, wherein the transition layer carrier concentration depth profile $n_z$ is determined through numerical solution of the diffusion equation:

$$\frac{\delta n_z}{\delta t} = \frac{\delta}{\delta z}\left[ D(T,n_z,t) \frac{\delta n_{z,t}}{\delta z} \right]$$

wherein, t is the time for which diffusion has taken place, D is the diffusion coefficient, and T is the temperature history for diffusion, and values of t, D and T or subset thereof are iteratively adjusted to achieve a best fit relationship between said spectra $R_c$ and R, to thereby determine the thickness and carrier concentration profile of the transition layer.

9. The method of claim 1, wherein at least one other of said layers, ju is undoped, wherein the free carrier concentration $n_{ju}$ equals zero, and wherein the complex refractive index $(h_{ju}+ik_{ju})^2$ equals $e_u(w)$, and wherein $h_{ju}$ and $k_{ju}$ are predetermined.

10. The method of claim 1, wherein a plurality of reflectance spectra are obtained from a plurality of areas on said exposed surface so as to produce a property-defining map of said structure surface.

11. The method of claim 10, wherein the plurality of areas may be composed of different layers j having different compositon, and known values of $(h_{ju}+ik_{ju})^2$ and itertively used to obtain the best fit relationship between said spectra $R_c$ and R, to thereby determine the thickness and compostion of said each area.

12. The method of claim 1, including the further steps of providing a substrate, preparing said structure in a deposition reactor by depositing at least said one layer j upon said substrate, determining the free carrier concentration of said substrate prior to deposition of said one layer and performing said radiation measurement at a speed sufficient to allow the thickness and free carrier concentration of said one layer to be determined as it is deposited.

13. The method of claim 12, providing the further step of removing some surface layer j during processing and measuring at sufficient speed to determine the free carrier concentration and thickness of the layer as it is removed.

14. The method of claim 13, wherein the carrier concentration and thickness are determined for the newly exposed j+1 layer.

15. The method of claim 12, providing the further step of thermally annealing the deposited layer j, and interatively adjusting $n_j$ and $z_j$ as to achieve a best fit relationship between said spectra $R_c$ and R, to thereby determine the thickness and carrier concentration of said annealed $j^{th}$ layer.

16. The method of claim 1, wherein said at least one layer of said structure is composed of a material selected from the group consisting of: metals, conducting metal oxides, doped semiconductors, undoped semiconductors, superconductors, and conducting polymers.

17. The method of claim 16, wherein at least one other layer of said structure is composed of a non-conducting polymers, ferroelectrics or dielectrics.

18. The method of claim 16, wherein said one layer is an epitaxial silicon film, and wherein said structure is depositied upon a doped silicon substrate.

19. The method of claim 18, wherein said one layer is of sub-micron thickness.

20. The method of claim 18, wherein said one layer has a free carrier concentration below $5 \times 10^{17}/cm_3$.

21. The method of claim 18, wherein said one layer is a doped polycrystalline silicon layer, wherein a first contacting layer on one side of said one layer is a cap of $SiO_2$, wherein a second contacting layer on the opposite side of said one layer is a layer of thermal $SiO_2$ with known refractive indices $(h_j+ik_j)$, and wherein an undoped silicon substrate is in contact with said second contacting layer.

22. The method of claim 17, wherein in said structure said one layer is a first layer and is of doped polycrystalline silicon, wherein a second layer, adjacent one side of said first layer, is a very thin $SiO_2$ film gate having a thickness of 20 to 200 A, and wherein a third layer, adjacent said second layer, is a silicon substrate.

23. The method of claim 20, wherein said polycrystalline silicon layer is measured in an unannealed condition.

24. The method of claim 22, carried out on an instrument that exhibits a temperature-dependent drift, wherein said reflectance spectrum R of said structure is corrected for such drift by effecting the further steps:

(f) using the instrument to measure radiation reflected from a selected material at an initial time and some later time to generate reflectance spectra $R_0$ and $R_t$, respectively, and thereby determining an instrument wavenumber dependent response function, f(n) defined as a best fit to $R_t/R_0-1$, (g) selecting a wavenumber $n_c$, where the reflection without drift $R_{dc}(n_c)$ is known to occur;

(h) determining a correction factor C, in accordance with the relationship:

$$C=[R(n_c)-R_{dc}(n_c)]/[R_{dc}(n_c)f(n_c)]; \text{ and}$$

(i) correcting said measured spectrum R in accordance with the expression $$R_{dc}(n)=R/[1+Cf(n_c)].$$

25. The method of claim 1, wherein said reflectance spectrum R is determined with reference to a surface of known reflectance.

26. Apparatus for the analysis of an article to determine the thickness and free carrier concentration of at least one layer of a structure of which the article is comprised said apparatus including:

(a) means for producing electromagnetic radiation of frequencies n throughout a selected spectral range, and for causing such radiation to impinge at a selected angle of incidence upon the surface of structure supported in a position proximate said apparatus;

(b) means for continuously measuring, as a function of frequency, specular reflectance of such impinging radiation from the surface of the structure so supported, and for storing data so obtained, the structure being composed of k layers of material wherein k is an integer and wherein the numbers 1, 2 ... k designate the relative position of each layer j in said structure; and (c) electronic data processing means programmed and operatively connected for processing reflectance data obtained by said means for measuring to determine the thickness and free carrier concentration of at least one layer of the supported structure, said data processing means being programmed to carryout the following steps:

(i) irradiating an exposed surface of said structure using spectral radiation within the range inclusive of the far-ultraviolet and far-infrared regions;

(ii) measuring radiation reflected from said surface to determine at least one reflectance spectrum R from said surface;

(iii) calculating a reflectance spectrum $R_c$ according to the expression:

$$R_c=ar_s^2+(1-a)r_p^2,$$

wherein a is the instrument-dependent polarization coefficient and is a constant having a positive value less than unity, and wherein $r_s$ and $r_p$ are the perpendicular (s) and parallel (p) polarized reflectance amplitude components of the reflectance spectrum and are calculated in accordance with the following matrix formalism:

$$r_s=\frac{(m_{11}+m_{12}g_{(k+1)s})g_{0s}-(m_{21}+m_{22}g_{(k+1)s})}{(m_{11}+m_{12}g_{(k+1)s})g_{0s}+(m_{21}+m_{22}g_{(k+1)s})}$$

$$r_p=\frac{(m_{11}+m_{12}g_{(k+1)p})g_{0p}-(m_{21}+m_{22}g_{(k+1)p})}{(m_{11}+m_{12}g_{(k+1)p})g_{0p}+(m_{21}+m_{22}g_{(k+1)p})}$$

wherein each of the matrix components: $m_{11}, m_{12}, m_{21}, m_{22}$ represents the product of four elements used to describe each layer j according to the expression:

$$\begin{bmatrix} m_{11} & m_{12} \\ m_{21} & m_{22} \end{bmatrix} = \prod_{j=1}^{k} m_j$$

said four elements of each layer j being defined for the perpendicular and parallel polarization, respectively, as:

$$m_{jp}=\begin{bmatrix} \cos b_{jp} & -i\sin b_{jp}/g_{jp} \\ -ig_{jp}\sin b_{jp} & \cos b_{jp} \end{bmatrix}$$

$$m_{js}=\begin{bmatrix} \cos b_{js} & -i\sin b_{js}/g_{js} \\ -ig_{js}\sin b_{js} & \cos b_{js} \end{bmatrix}$$

wherein $b_j$ is the optical path difference between the interface of said each layer j, and wherein $g_j$ is the effective complex refractive index, in accordance with the expressions:

$$b_{js}=2pnz_j(j_j+ik_j)\cos q_{js}$$

$$g_{js}=(h_j+ik_j)\cos q_{js}$$

$$b_{jp}=2pnz_j(h_j+ik_j)\cos q_{jp}$$

$$g_{jp}=\cos q_{jp}/(h_j+ik_j)$$

wherein n represents the wavenumbers, of said radiation, $z_j$ is the thickness of said each layer j, $(h_j+ik_j)$ is the complex refractive indices of said each layer j, $q_{js}$ and $q_{jp}$ are the angles of radiation inside said each layer j in accordance with the expressions:

$$h_0\sin q_0=h_j\sin q_{js}$$

$$h_0\sin q_0=h_j\sin q_{jp}$$

wherein $h_0$ is the refractive index of air, and $q_0$ is the angle of said radiation incident to said surface, and wherein the complex refractive index for said one layer, the $j^{th}$ layer, is calculated in accordance with:

$$(j_j+ik_j)^2 = e_u(w) - 4p(n_j e^2/m^*)/(w^2+iw\tau^{-1}),$$

wherein $e_u(w)$ represents the dielectric constant of the material of which said $j^{th}$ layer is composed, but devoid of free carriers, as a function of frequency w, e is the charge of the free carrier and has the value $1.6\times10^{-19}$ coulombs, m * is the effective mass of said carrier, $\tau$ is the scattering time of said carrier, and $n_j$ is the free carrier concentration of said $j^{th}$ layer; and (iv) comparing said calculated spectrum $R_c$ to said determined spectrum R, and iteratively assigning values to the parameters $n_j$ and $z_j$ so as to achieve a best fit relationship between said spectra $R_c$ and R, to thereby determine $n_j$ and $z_j$.

27. The apparatus of claim 26, further including means for supporting the structure subjected to analysis therein, said means for supporting being movable relative to said means for producing and said means for measuring so as to enable a plurality of spectra to be obtained from a plurality of areas on the surface of the structure, and to thereby enable production of a property-defining map of the structure surface.

28. The apparatus of claim 26, further including a processing chamber, wherein said means for measuring and said electronic data processing means operate at a rate sufficient to enable film thickness and free carrier concentration of said one layer to be determined as it is deposited within said chamber.

29. The apparatus of claim 28, further including means for controlling temperature within said chamber, wherein said means for measuring and said data processing means are capable of operation at temperatures in the range of 0° C. to 1000° C.

* * * * *

UNITED STATES PATENT AND TRADEMARK OFFICE
CERTIFICATE OF CORRECTION

PATENT NO. : 5,604,581
DATED : February 18, 1997
INVENTOR(S) : SHAOHUA LIU ET AL.

It is certified that error appears in the above-indentified patent and that said Letters Patent is hereby corrected as shown below:

Claim 1, column 10, line 67, and column 11, lines 7 and 15; and Claim 26, column 14, line 53, and column 15, line 6, at each location the term "$j_j$" should be -- $h_j$ --;

Claim 3, column 11, line 36, the letter "s" should not appear at the end of the expression;

Claim 5, column 11, line 64, the value in parentheses should be -- $n_j + n_j \pm 1$ --;

Claim 6, column 12, line 7, the "j + 1" term should be -- $j \pm 1$ --.

Signed and Sealed this

Thirteenth Day of May, 1997

BRUCE LEHMAN

*Attest:*

*Attesting Officer*          *Commissioner of Patents and Trademarks*